No. 838,626. PATENTED DEC. 18, 1906.
E. B. KIRBY.
SEPARATING TANK.
APPLICATION FILED DEC. 17, 1903.
2 SHEETS—SHEET 1.
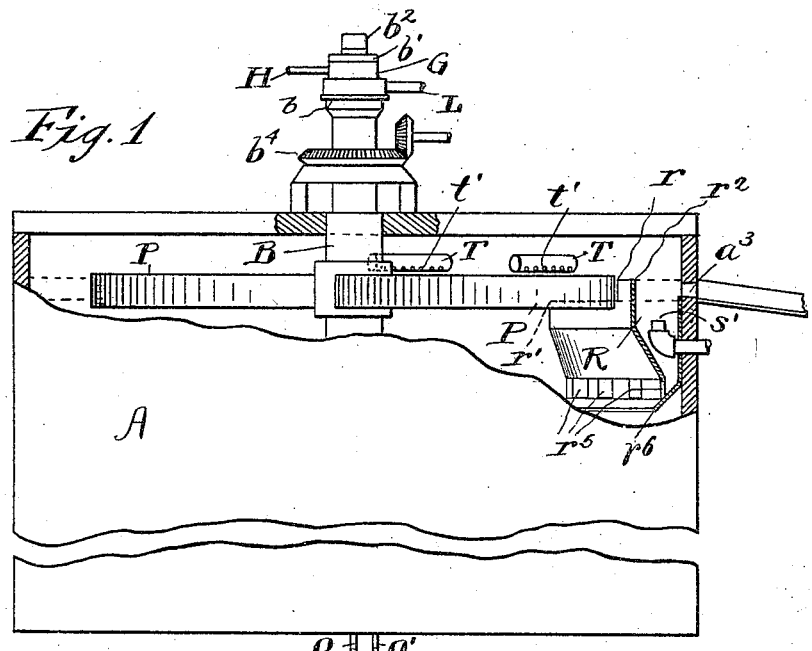
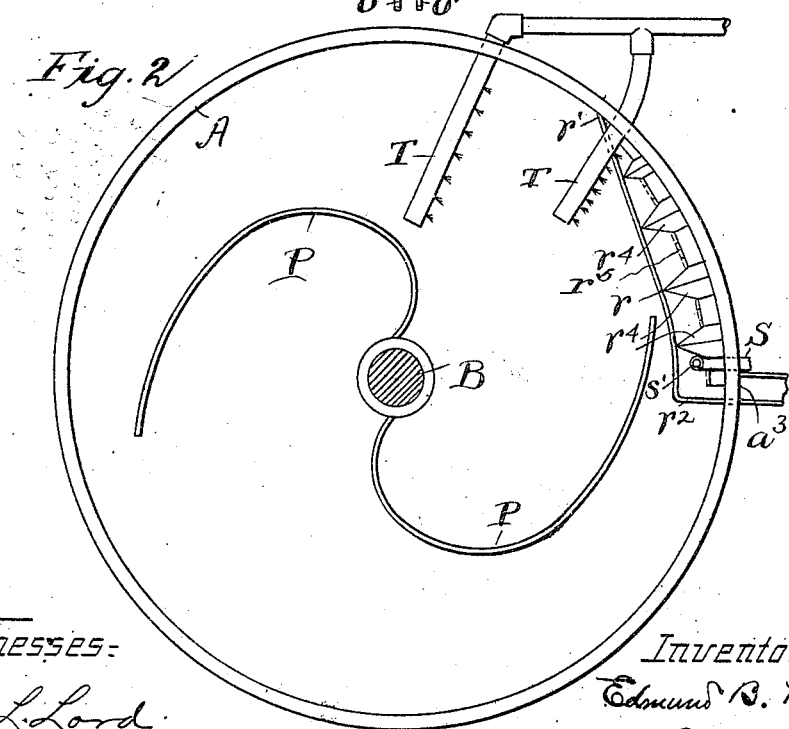
Witnesses:
A. L. Lord.
B. B. Brockett.
Inventor.
Edmund B. Kirby
By Thurston & Bates,
Attorneys.

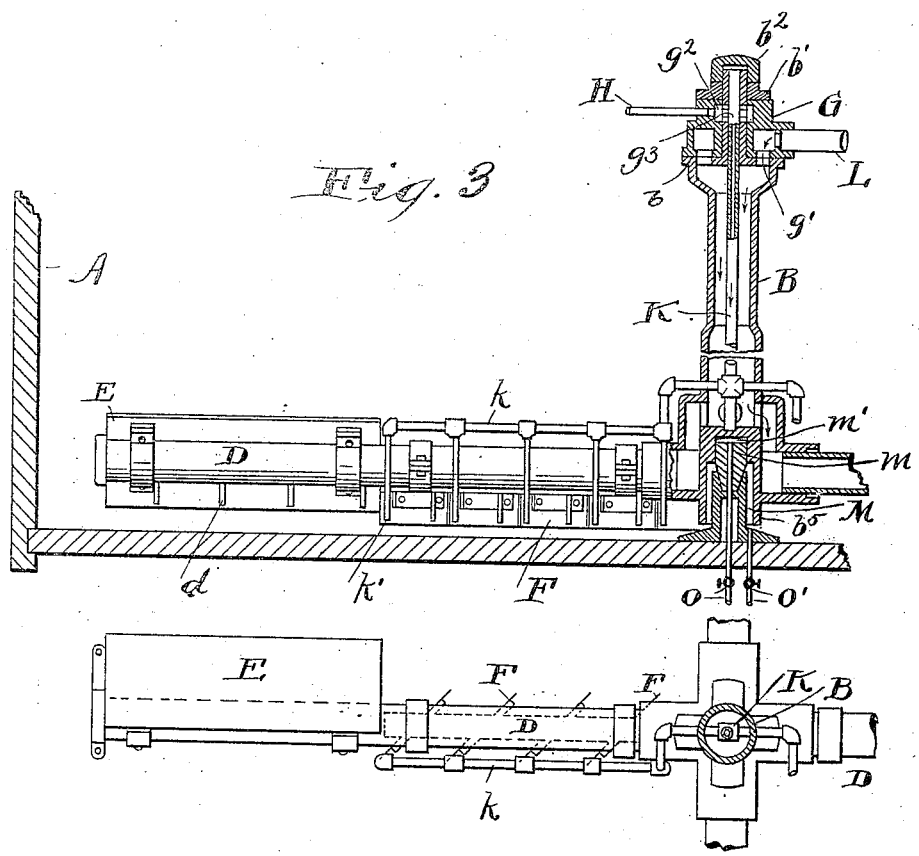

UNITED STATES PATENT OFFICE.

EDMUND B. KIRBY, OF ROSSLAND, BRITISH COLUMBIA, CANADA.

SEPARATING-TANK.

No. 838,626.  Specification of Letters Patent.  Patented Dec. 18, 1906.

Application filed December 17, 1903. Serial No. 185,475.

*To all whom it may concern:*

Be it known that I, EDMUND B. KIRBY, a citizen of the United States, residing at Rossland, in the Province of British Columbia and Dominion of Canada, have invented a certain new and useful Improvement in Separating-Tanks, of which the following is a full, clear, and exact description, reference being had to the accompanying drawings.

The object of this invention is to effect with substantial completeness the segregation of those pulverized mineral particles which have a preferential adhesion for water from those which have a preferential adhesion for a liquid immiscible in water—for example, oil, or a solution of bitumen in kerosene.

This invention is for the treatment of the charge after the pulverized mineral, the oil or solution, and the water have been thoroughly mixed together, whereby nearly all of the mineral particles which exhibit adhesive preference for the oil or solution have been coated therewith.

The invention is most useful when used to carry on one step of a process of my own invention, wherein the immiscible liquid employed is thin and light—as, for example, a solution of bitumen in kerosene; but the invention is also useful with oil processes for separating mineral particles.

This invention, which relates to the separator-tank and its coöperating adjuncts, may be here summarized as consisting in the construction and combinations of parts shown in the drawings and hereinafter described, as definitely set forth in the claims.

In the drawings, Figure 1 is an elevation, partly in vertical section, of an apparatus embodying my invention. Fig. 2 is a plan view thereof. Fig. 3 is a vertical sectional view of the agitator-shaft and a part of one side of the tank, and Fig. 4 is a sectional plan view of the said shaft and one of the agitator-arms secured thereto below the section-line.

The tank A is preferably cylindrical. Into it is to be charged the materials to be separated—to wit, pulverized ore, water, and some liquid lighter than water and immiscible therein, which will adhere only to the metallic mineral part of the pulverized ore—said materials having preferably been thoroughly mixed in another tank. The immiscible liquid may, as stated, be oil or a light hydrocarbon, or a solution of bitumen in a light hydrocarbon. The apparatus was especially designed for use with a charge consisting of ore, water, and solution of bitumen in kerosene, and therefore the immiscible liquid will for convenience of description be referred to herein as the "solution." The charge should be very fluid and should preferably contain three or four times as much water as mineral, some of which water may be added to the mixture after it has been transferred to the tank A.

Most of the solution and the solution-coated mineral particles rise immediately to the surface, from which they may be skimmed; but considerable quantities of the solution-coated concentrates are enveloped by and entrapped in the sands which settle to the bottom of the tank. For the primary purpose of freeing these particles from the sand and permitting them to float on the surface the vertical rotating agitator-shaft B and its adjuncts are provided. Arms D are secured to this shaft near the bottom of the tank, and as the shaft slowly rotates they gently lift the mass of sands from the bottom and overturn it and prevent it from packing, and thus permit the solution-coated particles to escape and float to the surface. These arms D are provided near their outer ends with lifting-plows E, whose front faces are set at an angle of about forty-five degrees. To these arms between the plows and the central shaft B are secured inclined scraper-blades F, which act to gradually push the material outward into the path of the plows.

It is very desirable that some gas, preferably air, shall be blown into the charge near the bottom thereof. This gas assists in agitating the charge; but its chief value is in the assistance it renders in floating the solution-coated particles to the surface. It is clear that some of these particles may be so large and heavy that the coating thereon may not be able to buoy them up, this being especially true in case the liquid used is thin and light, as the kerosene-bitumen solution. The gas-bubbles, however, not only tend to attach themselves to the solution-coated particles and to buoy them up after the fashion of balloons, but the water is caused to dissolve the gas to its maximum capacity. This dissolved gas tends to again separate from the water and attach itself in minute globules to the solution-coated particles, thus buoying them up and assisting their flotation.

It is thought that any gas which will not chemically combine with the charge may be employed in the manner and for the purpose stated; but is is definitely known that air, carbondioxid, hydrogen, and marsh-gas may be so used, air appearing to be rather the most efficient, as well as the cheapest. This gas may be injected in any way and by any means; but very efficient means for this purpose are shown in the drawings, said means consisting generally in making the shaft B and arms D hollow and providing the latter with discharge-openings and blowing the gas down through the shaft. The specific construction is as follows: The head of the shaft above the driving-gear $b^4$ is provided with a solution and air box G, which remains stationary while the shaft revolves and is supplied by the solution-pipe H and air-pipe L. The box rests on the rotating shoulder $b$ of the shaft B and is held down to a tight joint by the collar $b'$ and lock-nut cap $b^2$. Through the hollow shaft B extends a small solution-pipe K, the upper end of which is firmly inserted within the upward extension of the shaft and moves with and as a part of it. Air enters the annular chamber $g$ in said box, passing through a set of apertures $g'$ to the interior of shaft B. The solution enters a smaller annular chamber $g^2$, from which it passes by apertures $g^3$ into the top of the central pipe K. The air-current for the charge passes down through the shaft into the hollow arms D, from which it passes out through drop-pipes $d$. The solution is delivered from the pipe K to a series of radiating pipes $k$, which are secured to the arms D, and is discharged from branch pipes $k'$. This solution tends to attach itself to those particles not already coated, but which it will adhere to, and thus assists their flotation. The introduction of air and solution renders the separation substantially complete—that is to say, it causes substantially all of the particles which exhibit preferential adhesion for the solution to become coated thereby and floated to the surface.

The shaft B at its lower end has a stepped bearing which is supported on a pedestal M, provided with a wooden block $m$, which supports the moving wear-plates $m'$ of the shaft. Lubricating-water under pressure is introduced through the pipe O and finds its way out from the bearing into the tank. The sides $b^5$ of the shaft are carried down below the bearing, so as to leave an annular space between them and the pedestal. This annular space is intended to constitute an air-bell designed to assist the lubricating-water in excluding sand from the bearing. The air supplied to it is maintained by a small stream of air which escapes beneath the bell through the pipe O'.

A spiral skimming-bar P, (two are shown,) which is preferably secured to the rotating shaft B, so as to extend through the floating layer of concentrates, solution, and air-bubbles, acts to direct this floating layer into the settling-chamber R and to the overflow-outlet $a^3$. This chamber is separated from the rest of the tank by a partition $r$, the upper edge of which between the points $r$ and $r'$ is submerged sufficiently to allow the floating layer and some of the muddy water to pass over it, while the edge of this partition between the points $r$ and $r^2$ is raised above the liquid, so as to retain everything passing into it. There is an overflow-outlet $a^3$ from this settling-chamber through the side of the tank, which outlet is partly surrounded by the elevated part of this partition.

Owing to the agitation within the tank, caused by movement of the arms and the rising air-bubbles, the water even near the top is not clear, but turbid or muddy with slimes or fine particles of the non-coated minerals, which do not settle rapidly enough to get out of the way. The floating concentrates are carried mainly at the lower surface of the floating layer, where it is in contact with the water. The bottom of the overflow-outlet must be below the surface level of the water in order to clear them, and must therefore allow a portion of the water to pass out with the skimmings. This muddy water would therefore carry its suspended particles of the worthless minerals, which would make the concentrates impure.

The settling and washing chamber is designed to lessen or prevent this evil. As the floating material passes over its submerged edge it escapes from the swift current and rising air-bubbles, so that in its comparative quiet the slimes have a better opportunity to settle out of the way. The box is divided into compartments by submerged partitions $r^4$, as shown, each compartment terminating in a hopper-shaped bottom with discharge-openings $r^5$, through which the settled slimes may pass out again into the tank. Projecting shields $r^6$ prevent the air-bubbles from entering the hoppers and disturbing their quiet.

The passage of the floating material over several of these hoppers settles most of the slime before reaching the overflow-outlet. Before reaching the outlet, however, the skimmings pass over a stream of clean wash-water introduced at the point $s'$ through the pipe S shown. This wash-water is delivered under constant head from a supply-tank. Its quantity is made equal to that passing out through the discharge-gate with the skimmings, so that this discharge, being supplied entirely by the pure water close at hand, contains little or none of the muddy water, which is thus held back in the tank. It is evident that the incoming and outgoing streams are self-adjusting, because if too much enters the general level rises and a large stream flows from the orifice. The flow of the floating layer over the submerged partition of the settling-chamber and on to the overflow-outlet may be induced by properly-directed air-jets blown onto said floating layer from jet-openings *t* in one or more pipes T.

Having described my invention, I claim—

1. The combination of a separating-tank having an overflow-outlet, and a submerged settling-chamber in said tank discharging through said outlet, with a rotatable skimming-bar supported in said tank for directing the floating layer of concentrates into said settling-chamber and toward said overflow-outlet, substantially as specified.

2. The combination of a separating-tank containing a submerged settling-chamber at one side thereof, through whose side there is an overflow-outlet from said chamber, said chamber being formed by a partition which is partly submerged, and said chamber being divided into a plurality of hopper-shaped compartments, each having a discharge-opening through its lower end, substantially as specified.

3. The combination of a separating-tank containing a submerged settling-chamber at one side thereof, through which side there is an overflow-outlet from said chamber, said chamber being formed by a partition which is partly submerged, and said chamber being divided into a plurality of hopper-shaped compartments, each having a discharge-opening through its lower end, and a shield below each of said discharge-openings, substantially as specified.

4. The combination of a separating-tank containing a submerged settling-chamber at one side thereof, said settling-chamber having an overflow-outlet through one side of the tank, and said settling-chamber being formed by a submerged partition which projects above the surface of the fluid charge around said outlet but is at other places submerged below the floating layer on the surface of said charge, with a skimming-bar which is supported in the tank and is adapted to direct said floating layer over the submerged top of said partition into the settling-chamber and toward the overflow-outlet therefrom, substantially as specified.

5. The combination of a tank having an overflow-outlet, and a vertical rotatable shaft in said tank having agitator-arms located near the bottom of the tank, with a submerged settling-chamber in said tank discharging through said overflow-outlet, the inner partition of said chamber being extended around said outlet above the surface of the liquid charge and being submerged at other points below the floating layer of concentrates, and a spiral skimming-bar secured to the shaft so as to project through said layer whereby it directs the layer of concentrates into said settling-chamber, substantially as described.

6. A separating-tank having a submerged settling-chamber at one side, and an overflow-outlet from said chamber through said side, the inner wall of said chamber being above the surface of the fluid adjacent to said outlet, but submerged at other points below the floating layer of concentrates, and a pipe discharging clean wash-water into said settling-chamber close to said outlet, substantially as specified.

7. The combination of a separating-tank containing agitator mechanism, with means for discharging into the contained fluid charge a gas and a liquid lighter than water and immiscible therewith, substantially as specified.

8. The combination of a separating-tank, a hollow shaft rotatably mounted therein having hollow connected agitator-arms which are provided with a plurality of discharge-openings, a pipe extending through said shaft, branch pipes connected with said pipe and extending toward the sides of the tank and having downwardly-directed discharge-openings, and means for forcing gas down through said shaft, and means for forcing a liquid down through said pipe, substantially as specified.

9. The combination of a separating-tank, a rotatable agitator-shaft therein having arms secured to it near the bottom of the tank, said arms having lifting-plows near their outer ends and inclined scrapers between said plows and the shaft, substantially as described.

10. The combination of a tank, with a vertical agitator-shaft therein having a bell-shaped lower end, a pedestal which is embraced by said lower end whereby the shaft is supported, and means for discharging water into said bell-shaped shaft end, and means for discharging a gas into said bell-shaped shaft end, substantially as specified.

11. The combination of a separating-tank having an overflow-outlet, agitating mechanism, a skimming-bar, and a pipe having jet-openings arranged over the surface of the charge in the tank to move the floating surface layer toward said overflow-outlet, substantially as specified.

In testimony whereof I hereunto affix my signature in the presence of two witnesses.

EDMUND B. KIRBY.

Witnesses:
T. L. SAVAGE,
E. G. EASTMAN.